Figure 1:
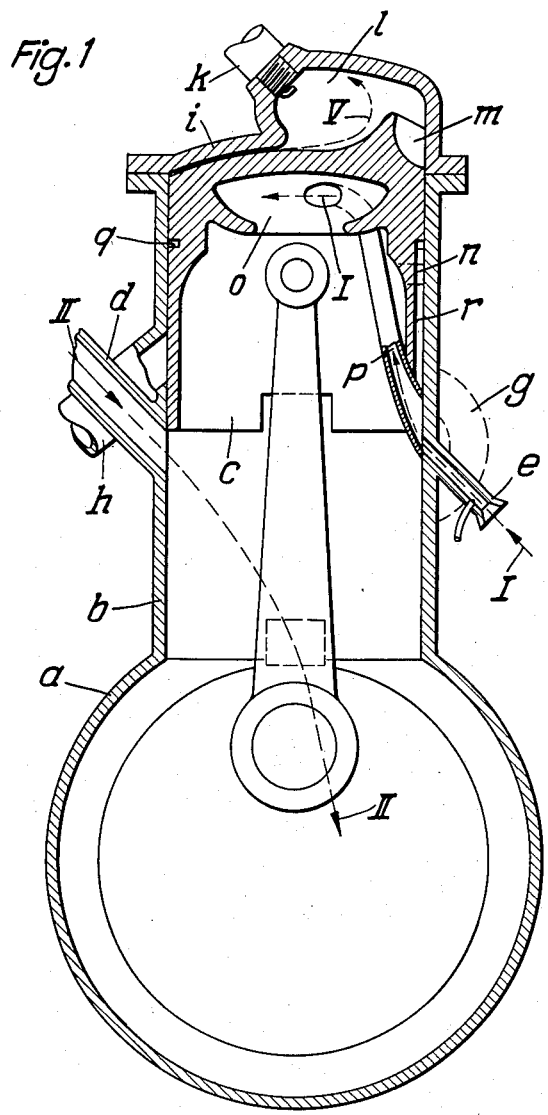

Jan. 10, 1961 F. STÜMPFIG 2,967,516
TWO CYCLE INTERNAL COMBUSTION ENGINE
WITH MEANS FOR FUEL EVAPORATION
Filed Sept. 2, 1958 2 Sheets-Sheet 1

Inventor:
FRIEDRICH STÜMPFIG
BY Robert H. Jacob
AGT.

Jan. 10, 1961  F. STÜMPFIG  2,967,516
TWO CYCLE INTERNAL COMBUSTION ENGINE
WITH MEANS FOR FUEL EVAPORATION
Filed Sept. 2, 1958  2 Sheets-Sheet 2
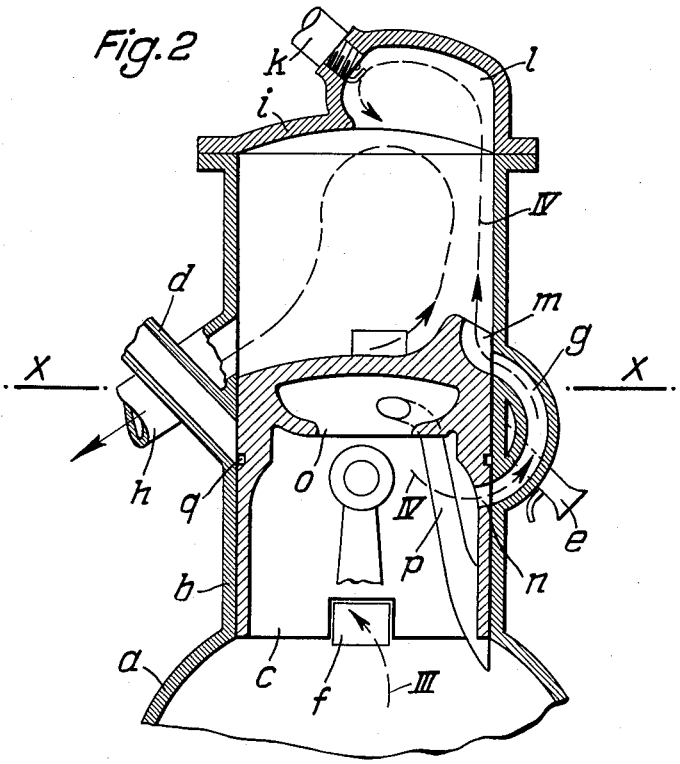
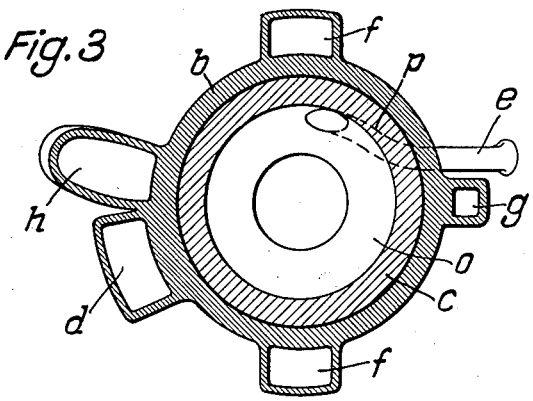
Inventor:
FRIEDRICH STÜMPFIG
BY Robert H. Jacob
AGT.

United States Patent Office 2,967,516
Patented Jan. 10, 1961

2,967,516

TWO CYCLE INTERNAL COMBUSTION ENGINE WITH MEANS FOR FUEL EVAPORATION

Friedrich Stümpfig, Bismarckstrasse 31, Nurnberg, Germany

Filed Sept. 2, 1958, Ser. No. 758,387

5 Claims. (Cl. 123—73)

This invention relates to a two cycle internal combustion engine which draws the main portion of the air of combustion into the crank case and a rich fuel and air mixture into the hollow of the piston. Machines of this type have already been proposed in order to prevent premature combustion during the scavenging of the cylinder or to avoid dilution of the lubricating oil in the crank case as well as excessive lubricant consumption. In these known machines the direction of the path of the fuel-air mixture changes at a right angle before introduction into the piston space in the lower cool part of the piston inside a broad and wide supply duct. In this connection the droplets of fuel contained in the mixture which is drawn in are to a large extent cast off against the wall of the supply dust so that, they either do not get into the piston space at all, but leave the supply duct in the direction of the cylinder wall, or they flow along the wall of the fuel supply duct or conduit into the piston space without establishing contact with the upper hot piston portion, i.e. without being evaporated thereon. The consequences of such defective construction are poor mixture formation and high fuel consumption.

It is an object of the invention to provide an improved machine wherein the entire fuel in the form of a rich fuel-air mixture is drawn into the hollow of the piston and wherein all fuel particles contained in the mixture are cast against hot piston surfaces upon which they are evaporated thereby obtaining improved mixture formation and more complete scavenging of the cylinder, resulting in substantially lower fuel consumption and consequent higher efficiency.

It is still a further object of the invention to provide a machine in which the dilution of the lubricant in the crank case is avoided to a very considerable extent, wherein the piston is extensively cooled and the use of fuels having high and low boiling points is made possible.

In accordance with the invention the evaporation cavity inside the piston which receives the rich fuel-air mixture and serves for evaporating the fuel has the general outline of a solid of revolution which is arranged immediately along the back side of the bottom of the piston and is connected by a central aperture with the remaining portion of the interior of the piston, and the supply of the rich fuel-air mixture to the evaporation cavity is effected through a supply conduit which leads tangentially into said cavity, the average cross section of which is preferably substantially smaller than the central aperture of the evaporation cavity.

In accordance with the invention the combustion engine may furthermore be constructed in a manner differing from the known machines where mixture is drawn into the piston hollow, in that the air intake is increased and thereby the scavenging of the cylinder is further improved, that the losses of fuel during the scavenging are decreased and it is made possible in machines to operate to the greatest possible extent with super compression above normal, as well as under partial load and idling conditions with super normally high excess of air, all of which contributes to a further improvement of the fuel consumption and of the efficiency of the machine.

Further objects, advantages and details of the invention will become apparent from the following description of an embodiment which is illustrated in the accompanying drawings in which:

Fig. 1 is a schematic illustration of a two cycle internal combustion engine showing the piston in its uppermost position, Fig. 2 illustrates the same machine with the piston in lowest position, also schematically, and Fig. 3 is a cross-section along line X—X of Fig. 2.

In accordance with this embodiment the crank case which is indicated at $a$, operates as a pump together with the piston $c$ which reciprocates in the cylinder $b$. The cylinder $b$ is provided with the air suction conduit $d$, the mixture intake duct $e$, one or two air overflow channels $f$, a mixture transfer channel $g$ and an exhaust outlet $h$. The upper closure of the cylinder is constituted by the cylinder head $i$ provided with the spark plug $k$ and the compression space $l$, the width of which vertically of the sectional planes of the figures is substantially smaller than the diameter of the cylinder. The piston $c$ presents a mixture diverting groove $m$, a mixture transfer aperture $n$, an evaporating cavity $o$ and a mixture supply conduit $p$, the upper part of which leads tangentially into the evaporation space which is curved about the longitudinal axis of the piston.

During each upward movement of the piston from the lower dead point position shown in Fig. 2 to its upper dead point position in accordance with Fig. 1 a sub-atmospheric pressure is maintained in the crank case, the lower part of the cylinder and in the piston cavity for a sufficient time until first the mixture intake duct $e$ communicates with the mixture supply conduit $p$ and somewhat later the lower edge of the piston opens the air intake conduit $d$, and now somewhat before and somewhat after the end of the upward movement of the piston a rich fuel-air mixture is drawn in in the direction of the arrow I by way of the mixture intake ducts $e$ and $p$ tangentially into the evaporation cavity, and air is drawn in in the direction of arrow II by way of the air intake conduit $d$ obliquely downwardly into the lower part of the cylinder and into the crank case.

The mixture conducted tangentially into the evaporation cavity circulates therein. The fuel particles contained in the mixture are whirled against the wall of the evaporation cavity which is heated during operation and are evaporated thereon in a manner that the fuel can only leave the evaporation cavity in the form of a rich fuel vapor-air mixture and thus arrive in the remaining space of the piston cavity.

During the following downward movement of the piston the air drawn in is pre-compressed essentially in the crank case, and the mixture drawn in is pre-compressed essentially in the evaporation cavity and in the adjoining upper portion of the hollow of the piston until the piston shortly before termination of its downward movement first opens the upper aperture of the air transfer channel or channels $f$ and somewhat later the mixture guiding groove $m$ as well as the mixture transfer aperture $n$ communicate with the mixture transfer channel $g$.

The air pre-compressed in the crank case now first flows in the direction of arrow III and somewhat later besides this air also the mixture which has been pre-compressed in the upper part of the piston cavity flows in the direction of arrow IV into the combustion chamber of the engine displacing therefrom the gases of combustion remaining from the previous combustion into the exhaust channel $h$ as indicated in Fig. 2, During this scavenging action the flow of air into the combustion space takes place between the incoming mixture and the exhaust channel. The mixture flowing upwardly in the chamber of combustion in a relatively thin stream along the wall of the cylinder enters primarily into the compression space $l$ and is deflected therein along a short arc while the air flowing upwardly in the combustion chamber is deflected along a wide arc outside of the compression chamber so that during the scavenging action primarily only the air can flow through the combustion chamber to the exhaust channel and fill the lower part of the combustion chamber while the movement of the mixture due to the deflecting and due to the air flow is so strongly retarded in the combustion chamber that the mixture during the scavenging remains primarily within and directly below the cylinder head. This, however, results in that during the following upward movement of the piston first only the mixture is compressed in the compression chamber and the main air is forced only towards the end of the upward movement of the piston, shortly before and shortly after the ignition of the mixture by the spark plug approximately in the direction of arrow V into the compression chamber and is combined therein with the mixture. The final mixing of the fuel and air thus takes place only after commencement of the ignition. Toward the end of the upward movement of the piston also the intake of air already described hereinabove into the lower part of the cylinder and into the crank case, as well as the intake of mixture into the evaporation cavity of the piston takes place. During the following downward movement of the piston during combustion of the mixture of the pre-compression of air in the crank case and of mixture in the piston cavity which already has been described is likewise repeated.

The construction of the combustion engine as described provides the following very important advantages: The feed of scavenging air, which in two cycle internal combustion engines having crank case pumps is too small for the complete scavenging of the combustion space, is increased by the intake of fuel vapor into the combustion chamber, thus already improving the scavenging and filling of the working cylinder. A further improvement of the scavenging of the combustion space and thus an increase of the engine efficiency is obtained in that drawing in of air, due to the intake of mixture which starts already earlier, can take place without choking, for example, through a low, very wide intake slit in the cylinder so that the quantity of air drawn in becomes greater than normal.

As a result of the evaporating of the fuel particles in the evaporation space the fuel is rendered into a form which is particularly advantageous for the correctly timed and complete combustion, the piston is strongly cooled and liquid fuel which dilutes the lubricating oil is kept away from the crank case and from the cylinder wall.

This results in a decrease of the fuel consumption and an increase of the engine efficiency, the improvement of the calmness during running of the machine and the adaptability of the piston for a smaller piston set which can now be utilized, as well as a decrease of the lubricant consumption as well as of the oil smoke in the exhaust gases while simultaneously improving the lubrication of the machine.

The manner of scavenging the space of combustion prevents fuel losses during scavenging and thereby decreases also the fuel consumption, because at the beginning and at the end of the scavenging action only air is introduced into the combustion chamber, the inflow of air takes place between the mixture stream and the exhaust channel and the movement of the mixture flowing into the compression chamber in the cylinder head is retarded so that during the scavenging no fuel or only a very small amount can reach the exhaust. A further improvement in the fuel consumption and of the machine efficiency is obtained in that the final mixing of the fuel and air takes place only during the combustion and consequently makes possible higher compression without the danger of knocking than what exists in the normal Otto engine. Since particularly rich fuel mixture is around the spark plug at the moment of ignition it is possible during partial load to operate with a considerable excess of air without ignition difficulties and thus also save fuel.

Even charges having very lean fuel content are reliably ignitable, which results in particularly smooth idle running of the machine. Due to the evaporation of fuel and the final mixing of the fuel and air only during the combustion, it is possible to use for operation besides benzine also fuels having higher boiling points and lower octane numbers.

The internal combustion engines in accordance with the invention can be constructed in different forms and may deviate substantially from the embodiment described as indicated by the following examples: The preparation of the rich fuel-air mixture is possible by means of a small carburetor placed in the mixture duct $e$ or in that the mixture feed duct $p$ draws in air into which the fuel is injected. In order to avoid a substantial deposit of fuel on the outside of the piston mantle it is possible to have an annular groove $q$ around the piston and a longitudinal groove $r$ which communicates therewith and which results in very small combustion gas quantities following downwardly during the downward movement of the piston into the mixture intake duct $e$ in spite of the piston rings, thus keeping the mixture from the mantle of the piston.

It is also possible to form the evaporation cavity for the fuel evaporation particularly advantageously, for example, to provide ribs extending into the evaporation cavity from the bottom of the piston or to construct the bottom of the piston and the evaporation cavity of particularly heat resisting material and thus have the evaporation cavity extend more or less into the combustion chamber.

The compression space may be in the form of a chamber and may be small enough to obtain self-ignition of the mixture. It is also possible to employ different scavenging systems in place of the reversed scavenging employed in accordance with the embodiment illustrated.

Having now described the invention with reference to the embodiment illustrated, I do not wish to be limited thereto, but what I desire to protect by Letters Patent of the United States is set forth in the appended claims.

I claim:

1. Two cycle internal combustion engine of the type adapted to pre-compress air in the crank case thereof, said engine comprising said crank case, a cylinder housing disposed above said crank case having fuel and air mixture and air intake apertures and a piston reciprocable in said cylinder, said piston having an evaporation cavity having the general outline of a solid of revolution defined below the piston head and having a central aperture communicating with the lower hollow part of said piston, a fuel and air mixture intake duct extending upwardly in said piston and having a discharge aperture tangentially of said cavity of a cross-sectional area smaller than said central aperture, and means including said duct providing for rich fuel and air mixture being drawn into said evaporation cavity while the major portion of the air of combustion is fed into the crank case and into the lower part of said cylinder, whereby the major part of the air of combustion is pre-compressed in said crank case while the rich fuel and air mixture is pre-compressed in said hollow part of said piston.

2. Two cycle internal combustion engine of the type adapted to pre-compress air in the crank case thereof, said engine comprising said crank case, a cylinder housing disposed above said crank case having fuel and air mixture and air intake apertures and a piston reciprocable in said cylinder, said piston having an evaporation cavity having the general outline of a solid of revolution defined below the piston head and having a central aperture communicating with the lower hollow part of said piston, a fuel and air mixture intake duct extending upwardly in said piston and having a discharge aperture tangentially of said cavity of a cross-sectional area smaller than said central aperture, and means including said duct providing for rich fuel and air mixture being drawn into said evaporation cavity while the major portion of the air of combustion is fed into the crank case and into the lower part of said cylinder, a fuel and air mixture flow channel extending upwardly along the wall of said cylinder having upper and lower channel apertures, an aperture in the wall of said piston below said cavity adapted to communicate with said lower channel aperture with said piston in downward position, an upwardly directed channel conformation defined in said piston head above said cavity adapted to register with said upper channel aperture with said piston in downward position and a compression chamber defined in the cylinder head above said cylinder housing having an aperture disposed in the path of the upward flow of the fuel and air mixture from said channel conformation, wherein rich fuel vapor and air mixture from said cavity is conducted into the compression space during scavenging, and at least one air duct intermediate the lower part and the central part of said cylinder adapted to conduct scavenging air from said crank case to said cylinder.

3. Two cycle internal combustion engine of the type adapted to pre-compress air in the crank case thereof, said engine comprising said crank case, a cylinder housing disposed above said crank case having fuel and air mixture and air intake apertures and a piston reciprocable in said cylinder, said piston having an evaporation cavity having the general outline of a solid of revolution defined below the piston head and having a central aperture communicating with the lower hollow part of said piston, a fuel and air mixture intake duct extending upwardly in said piston and having a discharge aperture tangentially of said cavity of a cross-sectional area smaller than said central aperture, and means including said duct providing for rich fuel and air mixture being drawn into said evaporation cavity while the major portion of the air of combustion is fed into the crank case and into the lower part of said cylinder, a fuel and air mixture flow channel extending upwardly along the wall of said cylinder having upper and lower channel apertures, an aperture in the wall of said piston below said cavity adapted to register with said lower channel aperture with said piston in downward position, an upwardly directed channel conformation defined in said piston head above said cavity adapted to register with said upper channel aperture with said piston in downward position and a compression chamber defined in the cylinder head above said cylinder housing having an aperture disposed in the path of the upward flow of the fuel and air mixture from said channel conformation, wherein rich fuel vapor and air mixture from said cavity is conducted into the compression space during scavenging, and an air duct or ducts intermediate the lower part and the central part of said cylinder adapted to conduct scavenging air from said crank case to said cylinder, said intake apertures being disposed at such levels relative to said mixture intake duct that the intake of rich fuel and air mixture into said cavity begins prior to the intake of air into said crank case.

4. Two cycle internal combustion engine of the type adapted to pre-compress air in the crank case thereof, said engine comprising said crank case, a cylinder housing disposed above said crank case having fuel and air mixture and air intake apertures and a piston reciprocable in said cylinder, said piston having an evaporation cavity having the general outline of a solid of revolution defined below the piston head and having a central aperture communicating with the lower hollow part of said piston, a fuel and air mixture intake duct extending upwardly in said piston and having a discharge aperture tangentially of said cavity of a cross-sectional area smaller than said central aperture, and means including said duct providing for rich fuel and air mixture being drawn into said evaporation cavity while the major portion of the air of combustion is fed into the crank case and into the lower part of said cylinder, whereby the major part of the air of combustion is pre-compressed in said crank case while the rich fuel and air mixture is pre-compressed in said hollow part of said piston, said rich fuel and air mixture intake duct to said cavity having curvatures exceeding 90° and a cross-section not substantially greater than the passage of the carburetor associated with said engine.

5. Two cycle internal combustion engine of the type adapted to pre-compress air in the crank case thereof, said engine comprising said crank case, a cylinder housing disposed above said crank case having fuel and air mixture and air intake apertures and a piston reciprocable in said cylinder, said piston having an evaporation cavity having the general outline of a solid of revolution defined below the piston head and having a central aperture communicating with the lower hollow part of said piston, a fuel and air mixture intake duct extending upwardly in said piston and having a discharge aperture tangentially of said cavity of a cross-sectional area smaller than said central aperture, and means including said duct providing for rich fuel and air mixture being drawn into said evaporation cavity while the major portion of the air of combustion is fed into the crank case and into the lower part of said cylinder, whereby the major part of the air of combustion is pre-compressed in said crank case while the rich fuel and air mixture is pre-compressed in said hollow part of said piston, said air intake aperture being associated with a downwardly directed duct connected to said cylinder.

References Cited in the file of this patent

FOREIGN PATENTS

| | | |
|---|---|---|
| 293,514 | Germany | Aug. 15, 1916 |
| 313,444 | Switzerland | May 31, 1956 |
| 1,133,598 | France | Nov. 19, 1956 |